(12) United States Patent
Bhimani et al.

(10) Patent No.: US 11,934,430 B2
(45) Date of Patent: Mar. 19, 2024

(54) VISUALIZATION OF ELEVATION BETWEEN GEOGRAPHIC LOCATIONS USING SEGMENTED VECTORS BASED ON GROUND AND CLUTTER ELEVATION DATA

(71) Applicant: T-Mobile Innovations LLC, Overland Park, KS (US)

(72) Inventors: Jeny Bhimani, Bothell, WA (US); Taha Lahrichi, Bellevue, WA (US); Farrah Young Lee, Bellevue, WA (US); Manish Mahendru, Shoreline, WA (US); James Byung Ha No, Covington, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/865,351

(22) Filed: Jul. 14, 2022

(65) Prior Publication Data

US 2024/0020322 A1    Jan. 18, 2024

(51) Int. Cl.
*G06F 16/00* (2019.01)
*G06F 16/28* (2019.01)
*G06F 16/29* (2019.01)

(52) U.S. Cl.
CPC ............ *G06F 16/29* (2019.01); *G06F 16/287* (2019.01)

(58) Field of Classification Search
CPC ............................... G06F 16/287; G06F 16/29
USPC ....................................................... 707/724
See application file for complete search history.

(56) References Cited

U.S. PATENT DOCUMENTS

| | | | |
|---|---|---|---|
| 8,185,103 | B2 | 5/2012 | Alfano et al. |
| 10,909,120 | B1 | 2/2021 | Mohamad et al. |
| 11,789,986 | B1 | 10/2023 | Bhimani et al. |
| 2008/0294678 | A1 | 11/2008 | Gorman et al. |
| 2010/0332593 | A1 | 12/2010 | Barash et al. |
| 2018/0004211 | A1* | 1/2018 | Grimm ................ G06Q 10/047 707/707 |
| 2019/0129844 | A1 | 5/2019 | Zhang et al. |
| 2019/0156566 | A1* | 5/2019 | Chen ....................... G06T 19/20 707/707 |
| 2019/0277640 | A1* | 9/2019 | Nelapati ............ G01C 21/3896 707/707 |

(Continued)

OTHER PUBLICATIONS

Office Action dated Jun. 16, 2023, U.S. Appl. No. 17/741,218, filed May 10, 2022.

(Continued)

*Primary Examiner* — Alexandria Y Bromell

(57) ABSTRACT

A method comprises receiving, by an elevation application communicatively coupled to a geospatial database, a request comprising a start location and an end location from a workstation, wherein the geospatial database stores elevation data describing ground elevations and clutter elevations at a plurality of different geographic locations, segmenting, by the elevation application, a path between the start location and the end location into a plurality of segments having an incremental distance, for each of the plurality of segments, constructing a segment vector comprising the ground elevation and clutter elevation of the segment, and constructing an elevation data structure comprising the segment vector for each of the plurality of segments.

20 Claims, 10 Drawing Sheets

(56) References Cited

U.S. PATENT DOCUMENTS

| | | | |
|---|---|---|---|
| 2019/0347820 A1* | 11/2019 | Golinsky | G08G 1/167 707/707 |
| 2020/0026720 A1* | 1/2020 | Liu | G05D 1/101 707/707 |
| 2021/0233722 A1 | 8/2021 | Pellegrini et al. | |
| 2021/0293547 A1* | 9/2021 | Kitaura | G01C 21/3602 707/707 |
| 2021/0392314 A1* | 12/2021 | Nims | B60R 1/31 707/707 |
| 2022/0065991 A1* | 3/2022 | Zhang | G01S 13/931 707/707 |
| 2022/0144305 A1* | 5/2022 | Ren | G01S 7/4808 707/707 |
| 2022/0146632 A1* | 5/2022 | Laverne | G01S 7/4813 707/707 |
| 2022/0175609 A1* | 6/2022 | Ding | F16M 11/18 707/707 |
| 2022/0206491 A1* | 6/2022 | Chung | G05D 1/0088 707/707 |
| 2022/0335842 A1* | 10/2022 | Thiyagarajan | G08G 5/0043 707/707 |
| 2023/0050467 A1* | 2/2023 | Govardhanam | G06T 5/50 707/707 |
| 2023/0367811 A1 | 11/2023 | Bhimani et al. | |
| 2023/0418847 A1 | 12/2023 | Bhimani et al. | |

OTHER PUBLICATIONS

Notice of Allowance dated Jun. 13, 2023, U.S. Appl. No. 17/840,603, filed Jun. 14, 2022.

Bhimani, Jeny, et al., "Methods and Systems for Efficient Data Importation for Data Visualization," filed May 10, 2022, U.S. Appl. No. 17/741,218.

Bhimani, Jeny, et al., "Methods and Systems for Querying Data Within a Geographical Boundary Using a Query Tool," filed Jun. 14, 2022, U.S. Appl. No. 17/840,603.

Final Office Action dated Jan. 5, 2024, U.S. Appl. No. 17/741,218, filed May 10, 2022 .

Razavi, N. Johns, M., "Processing Geospatial Data at Scale with Databricks," Dec. 5, 2019 (Year: 2019).

* cited by examiner

VISUALIZATION OF ELEVATION BETWEEN GEOGRAPHIC LOCATIONS USING SEGMENTED VECTORS BASED ON GROUND AND CLUTTER ELEVATION DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In telecommunications, the radio coverage of a carrier network refers to a geographic area where a communication device may communicate with a cell site of a carrier, for example, with a signal strength above a threshold. Within this geographic area, a communication device may be able to complete a call using the carrier network or a partner network. Radio coverage may depend on several factors, such as physical obstacles, radio frequencies, and the sensitivity and transmit efficiency of consumer equipment. Different carrier networks may have different coverage at various geographic locations. For example, a carrier network may have greater signal strength in larger cities, but poor signal strength in more rural areas.

Carrier companies may establish retail stores at various locations throughout the country, without necessarily considering the radio coverage in the area at which the retail store is located. For example, a carrier company may arbitrarily position retail stores throughout various locations in the suburbs of larger cities. However, some of these locations may have little to no radio coverage of the carrier network. As a result, those particular retail stores may not receive many customers. In addition, the customers that purchase devices from those retail stores likely live proximate to the retail store, in an area that also has little to no coverage. In this case, the customers often return the device to the retail store shortly after purchase. Therefore, carrier retail stores in areas with little to no radio coverage are often unsuccessful and unprofitable.

SUMMARY

In an embodiment, a method performed by a system to generate an elevation visualization is disclosed. The method comprises receiving, by an elevation application communicatively coupled to a geospatial database, a request comprising a start location and an end location from a workstation, wherein the geospatial database stores elevation data describing ground elevations and clutter elevations at a plurality of different geographic locations, determining, by the elevation application, an absolute distance between the start location and the end location, an angle between the start location and the end location, and an incremental distance by which to segment a path of the absolute distance between the start location and the end location, segmenting, by the elevation application, the path between the start location and the end location into a plurality of segments having the incremental distance, for each of the plurality of segments, determining, by the elevation application, a ground elevation of a segment of the plurality of segments and a clutter elevation of the segment, and constructing, by the elevation application, a segment vector comprising the ground elevation and clutter elevation of the segment, and constructing, by the elevation application, an elevation data structure comprising the segment vector for each of the plurality of segments, wherein an elevation visualization is generated based on the elevation data structure.

In another embodiment, a method performed by a communication system to generate an elevation visualization is disclosed. The method comprises storing, at a geospatial database, elevation data describing ground elevations and clutter elevations at a plurality of different geographic locations, receiving, by an elevation application hosted at a cloud system and in communication with the geospatial database, a request comprising a start location and an end location from a workstation, determining, by the elevation application, an absolute distance between the start location and the end location, an angle between the start location and the end location, and an incremental distance by which to segment a path of the absolute distance between the start location and the end location, segmenting, by the elevation application, the path between the start location and the end location into a plurality of segments having the incremental distance, for each of the plurality of segments, retrieving, by the elevation application, a ground elevation of a segment of the plurality of segments and a clutter elevation of the segment from the geospatial database, and constructing, by the elevation application, a segment vector comprising the ground elevation and clutter elevation of the segment, constructing, by the elevation application, an elevation data structure comprising the segment vector for each of the plurality of segments, wherein an elevation visualization is generated based on the elevation data structure, and displaying, by a workstation, the elevation visualization on top of a multilayer geographic visualization displayed on the workstation, wherein the multilayer geographic visualization depicts radio coverage data within a geographic area.

In yet another embodiment, a system comprising a workstation and a cloud system is disclosed. The workstation comprises at least one processor, at least one non-transitory memory, a client application stored in the at least one non-transitory memory, which when executed by the at least one processor, causes the at least one processor to be configured to receive a user input on a multilayer geographic visualization displayed on the workstation, wherein the user input indicates a start location and an end location, and send a request comprising location information describing the start location and the end location. The cloud system comprises a geospatial database configured to store elevation data describing ground elevations and clutter elevations at a plurality of different geographic locations, at least one processor, at least one non-transitory memory, an elevation application stored in the at least one non-transitory memory, which when executed by the at least one processor, causes the at least one processor to be configured to receive the request comprising the start location and the end location, segment a path between the start location and the end location into a plurality of segments having an incremental distance, wherein the incremental distance is based on an absolute distance between the start location and the end location, obtain a ground elevation of each of the plurality of segments and a clutter elevation of each of the plurality of segments, and construct an elevation data structure comprising a segment vector for each of the plurality of segments, wherein the segment for each of the plurality of segments comprises a ground elevation and clutter elevation for each of the plurality of segments, wherein an elevation visualization is generated based on the elevation data structure.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
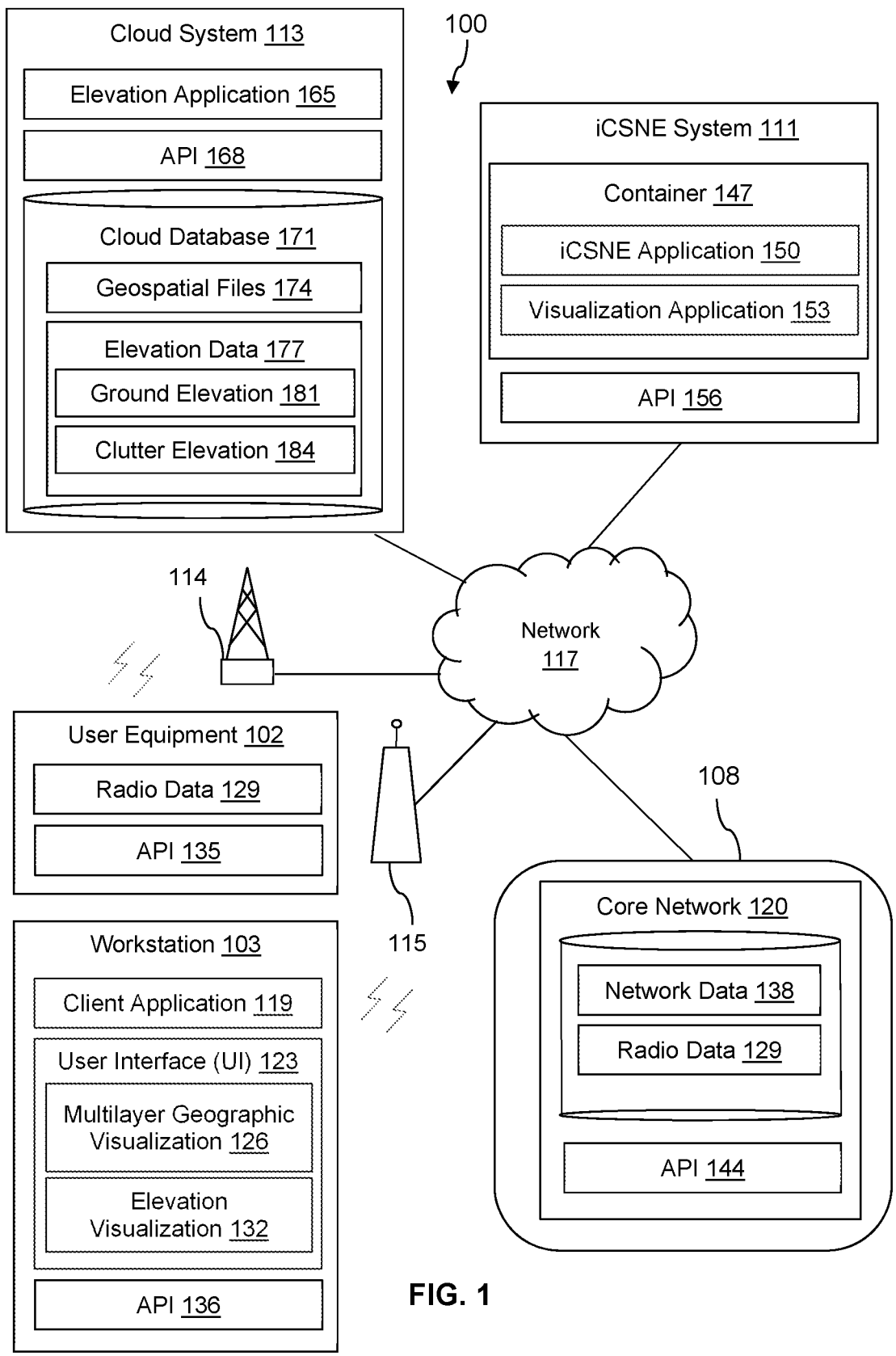
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It should be appreciated that the following example of an Interactive Corporate Strategy and Network Experience (iCSNE) platform describes an initial historical use case, but the system around the iCSNE platform has been expanded and applied to a host of uses. An iCSNE platform has been developed to better understand the reasoning behind certain retail store failures and to better determine the locations for potential new retail stores. The iCSNE platform may be implemented by an iCSNE system, which may either be included in a core network of a carrier network, included in a cloud system communicating with the carrier network, or external to the carrier network and/or the cloud system. An iCSNE system may generate multilayer geographic visualizations, such as a map, to illustrate various factors related to the carrier network radio coverage at one or more geographic areas. The multilayer geographic visualization may be generated based on various types of radio coverage data, in which the carrier network received the radio coverage data from various different sources. In some cases, the radio coverage data obtained from the various different sources may be referred to as layers. The iCSNE system may generate the multilayer geographic visualization, using the radio coverage data from the various different sources, in which the data obtained from each source is a different layer on the multilayer geographic visualization. The iCSNE system may send the multilayer geographic visualization to one or more workstations running an iCSNE client application for display at the workstation. In some cases, the user may utilize the multilayer geographic visualization to view the locations of existing cell sites and/or plan a location for future cell sites. Additional details regarding the iCSNE platform, the iCSNE system, and the multilayer geographic visualization is further described in U.S. patent application Ser. No. 17/741,218, filed May 10, 2022, by Jeny Bhimani, et. al., entitled "Methods and Systems for Efficient Data Important for Data Visualization," which is hereby incorporated by reference in its entirety.

In some cases, the user may utilize the multilayer geographic visualization to view the locations of existing cell sites and/or plan a location for future cell sites. In particular, field engineers, employed with the carrier network, may often perform more detailed analyses regarding existing cell sites and/or future cell sites. However, the process of determining a potential new cell site location or assessing the value of an existing cell cite may require time consuming physical examinations and complex calculations. To determine a potential new cell site location, the field engineer may first visit a location of the potential cell site to physically examine the geographic area around the location for potential physical obstructions that may compromise signals transmitted to and from the cell site. The field engineer may then record this data into numerous spreadsheets, such that various complex calculations may be performed on this data to determine the success of positioning the cell site at the examined location. Similarly, to assess the value of an existing cell site, the field engineer may first visit the location of the existing cell site to physically examine the geographic area around the location for physical obstructions that are compromising signals transmitted to and from the cell site. The field engineer may then record this data into the spreadsheets to perform the complex calculations and determine reasons behind the failure of the cell site.

In addition, some field engineers may use subjective, tribal knowledge to asses the cell site locations, thus leading to inconsistencies in the determinations made regarding the placement of cell sites. The complex queries, data processing inefficiencies, and inconsistent data resulting from the foregoing technique of cell site location analysis results in a significant technical problem related to the waste of computation and network resources. In addition, this laborious and complex process is further hindered by the lack of any existing technologies that can be used to easily visualize elevation differences between multiple locations on a map.

Disclosed herein are embodiments directed to a technical solution to the foregoing technical problems, by providing a resource efficient elevation visualization system for generating visualizations displaying the elevation differences at various points between geographic locations. The elevation visualization system may include a client workstation, a geospatial database located at a cloud system, and an iCSNE application executing at an iCSNE system in either the carrier network or at the cloud system.

First, a user of the elevation visualization system, such as, for example, a field engineer or any other employee of the carrier company, may obtain elevation data describing a ground elevation and a clutter elevation for various locations nationwide or worldwide. A ground elevation may refer to an elevation of the ground or surface of a particular location relative to sea level. The clutter elevation may refer to an elevation of any type of clutter at the particular location relative to the ground elevation (or sea level). Clutter may refer to objects that extend upwards from the ground, which may obstruct signals passed through the air above ground. For example, the clutter may include buildings (e.g., high rises), foliage (e.g., trees, plants, bushes), fixed structures (e.g., statutes, flagpoles, towers), electric wires, rocks, grave, or any other physical structure above ground of a location. The clutter elevation may be determined by adding the height of the clutter, or object above ground, to the ground elevation at that location.

In some embodiments, the user may collect the elevation data from various different open source data sources or database, such as, for example, city records, land records, or any other type of public database storing elevation data and corresponding location information (e.g., latitude and longitude coordinates). The types of files that may be permitted to be stored at the geospatial database may include, for example, a Shapefile, a TAB file, a keyhole markup language (KML) file, or a comma separated value (CSV) file. In some cases, other types of files may be permitted to be stored at the geospatial database as well, when the files may be used to generate the multilayer geographic visualizations. A Shapefile may be a format for storing geometric location and attribute information of geographic features, a TAB file may be tab-delimited text or data file containing tab-separated values, a KML file may be used to display geographic data in an Earth browser, and a CSV file may be a plain text file that contains a list of data using a comma to separate values.

For example, the user may collect elevation data from open source databases (e.g., county records) across different counties, on a county-by-county basis. The geospatial database may convert the elevation data into one or more geospatial files that may be stored at the geospatial database. To this end, pre-processing, normalization, and/or conversion functions may be performed on the collected elevation data to seamlessly align and normalize the elevation data retrieved from various different types of open source databases, before storing the elevation data at the geospatial server. In an embodiment, the pre-processing of the elevation data may involve storing additional metadata with the elevation data, in which the metadata may include contextual details regarding the elevation data. For example, the metadata may indicate that the elevation data is geographic data, network data, tower location data, user traffic pattern data related to user activity in various geographic data, methods of normalizing the elevation data into the geospatial database, etc. The elevation data, including the ground elevation data and clutter elevation data, may be stored in associated with corresponding location data of a location associated with the respective elevation values. The location data may include latitude and longitude values and/or a range of latitude and longitude values (i.e., covering a geographic area between the outer limits of the range of latitude and longitude values).

In some cases, in which the location is an area or a region, the ground may be a terrain with multiple different ground elevations within the area, and/or the clutter elevation may vary throughout the area because of, for example, multiple buildings/trees of different heights. In this case, the elevation visualization system may store all of the different ground elevations and clutter elevations. In an embodiment, the elevation visualization may average all of the ground elevations for the area to obtain a single ground elevation value for that location, and average all of the clutter elevations for the area to obtain a single clutter elevation value for that location. Alternatively, the elevation visualization may select the highest/lowest of all the ground elevations for the area to obtain a single ground elevation value for that location, and select the highest/lowest all of the clutter elevations for the area to obtain a single clutter elevation value for that location. The ground elevation value and the clutter elevation value may be any value greater than 0. The process of retrieving and storing the elevation data may be periodically performed to ensure the elevation data at the geospatial database is up-to-date.

After the data is stored at the geospatial database, a user may interface with the multilayer geographic visualization on a workstation to select two points on the multilayer geographic visualization, representing a start location and an end location. The user may also select an icon on the user interface to request an elevation visualization between the start location and the end location. An elevation visualization may refer to any type of human viewable visualization that indicates variations in elevations on a path, or line, between the start location and the end location. The path between the start location and end location refers to a geographic area between the start location and the end location, and may comprise a range of latitude and longitude coordinates within the geographic area. In an embodiment, the user may also enter or select an incremental distance by which to segment the path between the start location and end location into multiple different segments representing incremental locations along the path. Alternatively, the system may preset an incremental distance by which to segment paths between various start locations and end locations. The incremental distance may be based on a total distance between a start location and end location (e.g., may be proportional to the total distance).

The workstation may transmit, to an elevation application associated with the geospatial database, a start latitude and start longitude of the start location, an end latitude and end longitude of the end location, and the incremental distance when entered by the user. The elevation application may be hosted on the cloud system with the geospatial database or hosted on a server communicatively coupled to the geospatial database. The elevation application may then determine an angle between the start location and end location, and determine an absolute distance between the start location and the end location using, for example, open source map information. The elevation application may then divide the path between the start location and the end location into multiple segments based on the incremental distance. For example, if the absolute distance between the start location and the end location is 100 meters (m), and the incremental distance is 25 m, then the elevation application may divide the path into four segments, each being 25 m. Each segment may be of the incremental distance and may correspond to location information. The location information may be a latitude and longitude value or a range of latitude and longitude values (i.e., a geographic area within the range of latitude and longitude values).

The elevation application may then determine the ground elevation and clutter elevation for each of the segments. In an embodiment, the elevation application may retrieve the ground elevation and clutter elevation for the respective locations from the geospatial database. The elevation application may perform a look-up at the geospatial database based on the location information (e.g., latitude and longitude values) associated with each segment to determine the ground elevation and clutter elevation of each segment. The elevation application may then construct an elevation data structure, such as, for example, a list or an array, including multiple segment vectors representing each segment. Each segment vector may include the ground elevation and clutter elevation for the respective segment.

In an embodiment, the elevation application may generate (e.g., render) the elevation visualization between the start location and the end location using geospatial and software libraries. The elevation application may transform the elevation data in the elevation data structure into a human viewable visualization format as the elevation visualization using the libraries. In another embodiment, the elevation application transmits the elevation data structure to the iCSNE server, which may maintain similar geospatial and software libraries. In this case, the visualization application at the iCSNE system may process the elevation data in the elevation data structure to transform the elevation data in the elevation data structure into a human viewable visualization format as the elevation visualization using the libraries. In either of these embodiments, the elevation visualization is rendered external to the workstation and then transmitted to the workstation.

In another embodiment, the elevation application transmits the elevation data structure to the workstation operated by the user. In this case, the workstation may process the elevation data in the elevation data structure to transform the elevation data in the elevation data structure into a human viewable visualization format as the elevation visualization using various software libraries. The workstation may then display the elevation visualization as a separate window or superimpose the elevation visualization on top of the multilayer geographic visualization.

The elevation visualization may display the ground elevation and clutter elevation at various points along the area of the path between the start location and end location. For example, the elevation visualization may be any type of visualization, such as, a histogram, chart, graph, scatter plot, etc. The elevation visualization may also be a 2-dimensional or 3-dimensional simulation of the area on the path between the start location and the end location.

In this way, the elevation visualization provides a clear visual indication of potential obstructions on the path between the start location and the end location, which may compromise, dampen, or otherwise block signals being transmitted between cell sites at these locations. As such, the elevation visualization, and thus the elevation visualization system, may be used by field engineers for various different purposes. For example, a field engineer may use the elevation visualization to assess a strength of signals being transmitted between cell sites positioned at the start location and end location, to determine positions for the placement of new cell sites, to determine whether to adjust the height or angle of the cellular technologies (e.g., antenna arrays) positioned on a cell tower, etc. Carrier network employees may also use the elevation visualization system in a variety of different ways, such as, for example, to address complaints by subscribers of coverage dead zones.

As an example, the elevation visualization may present a line from a predefined height (e.g., height of cellular technologies (e.g., antenna) at a first cell site) at the start location to a predefined height (e.g., height of cellular technologies at a second cell site site) at the end location, in which the line represents a radio line-of-sight trajectory. The elevation visualization may be used to select locations for a new cell site and possibly to determine desired heights of cellular technologies at the cell tower. For example, a field engineer may use the elevation visualization system iteratively to find a desired spot for a new cell site. For example, a first candidate cell site location (e.g., start location) may be found to not have a line-of-sight to a target point (e.g., end location). The field engineer may then reiterate the elevation visualization by selecting a different candidate cell site location (e.g., new start location) in relation to the same target point (e.g., end location) to determine whether the second candidate cell site location has a line-of-sight to the target point. If the second candidate cell site location does not have a line-of-sight to the target point, then a third candidate cell site location may be selected, and so on. When a candidate cell site location has a line-of-sight to the target point, the field engineer may select the candidate cell site location as a suitable location for a new cell site.

As mentioned above, the multilayer geographic visualization is generated based on the stored data regarding existing cell towers, network antennas/tuning, coverage data, and other network attributes. When the elevation visualization is overlaid on top of the multilayer geographic visualization, the elevation data in the elevation visualization may be seamlessly blended together with the data visually displayed on the multilayer geographic visualization. This seamless blending of the coverage data with the elevation data may provide a vivid and an easy to understand visualization regarding how the clutter elevation changes in a geographical area affect the coverage and network signal strength at the particular geographic location. In this way, a user viewing the elevation visualization overlaid on top of the multilayer geographic visualization may not only immediately recognize the potential line of sight at various elevations, but also the potential coverage variations at the different lines of sight.

In an embodiment, the elevation visualization may be displayed in a quick and accessible manner, while dynamically adapting to changing configurations as needed even when overlaid on top of the multilayer geographic visualization. For example, the elevation visualization may first be presented based on a first user-selected start location and end location. For example, the elevation visualization may be presented in the form of a histogram on top of the multilayer geographic visualization visually displaying coverage data in a geographic area including the start location and the end location. In an embodiment, the user may interact with the multilayer geographic visualization to select a different start location and end location, which may trigger the foregoing process to generate a new elevation visualization. The previously displayed elevation visualization may be removed from display, and instead, the new elevation visualization may be presented for display. In this way, the user may continuously interact with the multilayer geographic visualization to select different start locations and end locations and analyze the corresponding line of sight and coverage data in an efficient manner.

Aside from reducing the manual labor required for cell site analysis, the embodiments disclosed herein also provide technical improvements to the technical field of data processing. For example, field engineers may no longer need to create massive spreadsheets and repeatedly run complex queries on the spreadsheets to determine the potential success of a new cell site at a certain location, or assess the strength of an existing cell site. Instead, field engineers may simply select locations on the user interface of a workstation running the iCSNE application, and request an elevation visualization between the two locations. The elevation visualization system seamlessly gathers the data in the background and renders the elevation visualization for display at the workstation, for the field engineer to make decisions accordingly. The elevation visualization also produces consistent results from one field engineer to another, since the data used to generate the elevation visualization is not dependent on tribal knowledge of different field engineers or the subjective judgment of different field engineers. In addition, the embodiments disclosed herein also enable the elevation visualizations to be computed using rich, prestored data, at the cloud system, to preserve resources at the carrier network. The embodiments disclosed herein also improve the efficiency of the processing involved to produce a visualization from the open source elevation data by using segment vectors representing the ground and clutter elevations at different heights.

Turning now to FIG. 1, a communication system 100 is described. The system 100 comprises a UE 102, a workstation 103, a carrier network 108, an iCSNE system 111, a cloud system 113, a cell site 114, a home network device 115, and a network 117. The UE 102 may be communicatively coupled to the carrier network 108, network 117, iCSNE system 111, and the cloud system 113 via the cell site 114 or the home network device 115. The workstation 103 may also be communicatively coupled to the carrier network 108, network 117, iCSNE system 111, and the cloud system 113 via the cell site 114 or the home network device 115.

The UE 102 may be a cell phone, a mobile phone, a smart phone, a personal digital assistant (PDA), an Internet of things (IoT) device, a wearable computer, a headset computer, a laptop computer, a tablet computer, a notebook computer, a medical monitoring device, a vehicle computer, etc. The UE 102 may store radio data 129, which may be collected using, for example, a carrier application running at the UE 102. The radio data 129 may include mappings between a particular geographic location and radio coverage data at that geographic location (e.g., radio coverage, signal strength, bandwidth, etc.). The UE 102 may also include one or more application programming interfaces (APIs) 135, which may be used to communicate with the carrier network 108, the iCSNE system 111, and/or the cloud system 113. For example, the UE 102 may collect the radio data 129 and transmit the radio data 129 to the core network 120 using API 135. The UE 102 may belong to a subscriber of the carrier network 108, registered with the carrier network 108.

The workstation 103 may be, for example, a desktop computer, laptop computer, tablet computer, notebook computer, or any other type of computer. A workstation 103 may be used by a field engineer, carrier technologist, or employee of the carrier (as opposed to a subscriber of the carrier network), and the workstation 103 may execute a proprietary and restricted visualization tool, for example, using a client application 119. The client application 119 may correspond to the iCSNE system 111 and execute a client side of the iCSNE platform. The workstation 103 may include a UI 123, displayed on a display of the workstation 103 with other data from the client application 119. A user operating the workstation 103 may interact with the client application 119 using the UI 123. The UI 123 may display the multilayer geographic visualization 126, which as described above, may be a visualization (e.g., a map) indicating radio coverage data, cell site locations, retail store locations, and any other data related to the carrier in relation to a geographic area. The UI 123 may also display the elevation visualization 132, which as described above, is a visual depiction indicating variations in elevations on a path between a user-entered start location and end location. The user may select the start location and the end location on a map, such as the multilayer geographic visualization 126, by interacting with the UI 123. The workstation 103 may also include one or more APIs 136, which may be used to communicate with the carrier network 108, the iCSNE system 111, and/or the cloud system 113.

The home network device 115 may be a modem, wireless router, and/or gateway configured to provide Internet access to UE 102 and/or workstation 103, for example, via the carrier network 108 and network 117. For example, the home network device 115 may be a wireless access point, through which the UE 102 and/or workstation 103 may access the Internet, the carrier network 108, the iCSNE system 111, and/or the cloud system 113. The cell site 114 provides the UE 102 and/or workstation 103 a wireless communication link to the carrier network 108, network 117, the iCSNE system 111, and/or the cloud system 113 according to a 5G, a long term evolution (LTE), a code division multiple access (CDMA), or a global system for mobile communications (GSM) wireless telecommunication protocol. The network 117 may be one or more private networks, one or more public networks, or a combination thereof. While FIG. 1 shows the carrier network 108, the iCSNE system 111, and the cloud system 113 as being separate from the network 117, it should be appreciated that, in some embodiments, at least a portion of the carrier network 108, the iCSNE system 111, and the cloud system 113 may be part of the network 117.

The carrier network 108 may be a network including a radio access network (RAN) and a core network 120. The RAN may include the access network containing the radio elements of a cell network, and the core network 120 may include the elements that manage the subscriber information, call setup and routing, and related system supports. In an embodiment, the core network 120 may be an evolved packet core (EPC) core network. The core network 120 may be a configured to implement a 5G, a LTE, a CDMA, or a GSM wireless telecommunication protocol. In one embodiment, the core network 120 may be a 3rd Generation Partnership Project (3GPP) Evolved Packet System (EPS).

The core network 120 may store radio coverage data received from various different sources. In an embodiment, the radio coverage data may include a network data 138 and radio data 129. The network data 138 may include radio coverage data or network attribute data related to the coverage provided by the carrier network 108 at one or more network elements within the network 117 and the carrier network 108. The radio coverage data or network attribute data included in the network data 138 may include, for example, signal strength, bandwidth (e.g., frequency bands), latency, throughput, supported wireless technologies, types of devices communicating with the network element, antenna patterns, etc. One or more network elements in the network 117 and/or carrier network 108 may determine or measure the network data 138 for the carrier based on communications with devices registered with the carrier. The network elements may transmit the network data 138 to the core network 120 for storage at the core network 120, or elsewhere within the carrier network 108, or even external to the carrier network 108.

The radio data 129 may be received from devices registered with the carrier, such as UE 102. The radio data 129 may include the mappings between a particular geographic location and radio coverage data at that geographic location. The core network 120 may store other data received from various other sources and publicly available information.

As described above, the iCSNE system 111 may access the network data 138 and/or the radio data 129 at the core network 120 to create one or more layers in a multilayer geographic visualization 126, which may be sent to the workstation 103. The carrier network 108 may also include one or more APIs 144, which may be used to communicate with the UE 102, workstation 103, iCSNE system 111, and/or cloud system 113. While FIG. 1 shows the core network 120 as storing network data 138 and radio data 139, it should be appreciated that the core network 120 also includes other data and applications not otherwise shown in FIG. 1.

The iCSNE system 111 may include a set of servers with storage, processing, and communication capabilities. While the iCSNE system 111 is shown as separate from the carrier network 108 and the cloud system 113 in FIG. 1, in an embodiment, the iCSNE system 111 may be part of the carrier network 108 and/or the cloud system 113. In another embodiment, the iCSNE system 111 may be external to the carrier network 108 and/or the cloud system 113. The iCSNE system 111 may be communicatively coupled to the UE 102, workstation 103, carrier network 108, network 117, and cloud system 113 via the cell site 114, such that the iCSNE system 111 may communicate with the UE 102, workstation 103, carrier network 108, network 117, and cloud system 113 via the cell site 114.

The iCSNE system 111 may include a software container 147 and one or more APIs 156. The container 147 is a software package including code, files, and dependencies such that one or more applications may execute quickly and reliably when the container 147 is transferred from one computing environment to another. For example, the container 147 may be a DOCKER container. The container 147 may store an iCSNE application 150, and a runtime environment, tools, libraries, settings, and other dependencies for the iCSNE application 150. The iCSNE application 150 may be responsible for at least a portion of the processing and communications involved to generate a multilayer geographic visualization 126 using import files carrying radio coverage data, radio data 129, and/or network data 128. The container 147 may also store a visualization application 153, which may be used to render the multilayer geographic visualization 126 and/or the elevation visualization 132, or which may communicate with other systems to generate the multilayer geographic visualization 126 and/or the elevation visualization 132. While the visualization application 153 is shown in FIG. 1 as being included in the container 147, in another embodiment, the visualization application 153 may be external to the container 147, but still stored at the iCSNE system 111. Although FIG. 1 shows the iCSNE application 150 and the visualization application 153 as being separate, in an embodiment, the function of the visualization application 153 may be part of the iCSNE application 150. The APIs 156 may also be used to communicate with the UE 102, workstation 103, the carrier network 108, and/or the cloud system 100. It should be appreciated that the iCSNE system 111 may include other components and applications not otherwise shown in FIG. 1.

The cloud system 113 may be implemented as a cloud computing environment and may provide an on-demand availability of data storage and processing resources, without direct active management by the carrier. The cloud system 113 may comprise multiple servers and memories (e.g., databases and data stores), often distributed over multiple locations, with each location being a data center. The cloud system 113 may be owned and operated by a cloud host. The cloud system 113 may offer a pay-as-you-go model, in which users pay for storage and processing resources as they are used, which can help reduce capital expenses for operations.

As shown in FIG. 1, the cloud system 113 includes an elevation application 165, one or more APIs 168, and a cloud database 171 (also referred to herein as the "geospatial database"). As described herein, the elevation application 165 receives the start location and end location from the workstation 103 after the user has selected the start location and end location on the UI 123. The elevation application 165 may also obtain the incremental distance by which to segment the path between the start location and the end location, either from the user or based on a default setting. The elevation application 165 may then determine the angle between the start location and end location, determine the absolute distance between the start location and end location, and then construct the elevation data structure indicating the ground elevation and clutter elevation for each segment, as described herein.

The cloud database 171 may refer to a geospatial database, databases or data stores in the cloud system 113, which are managed using a relational database management system. For example, a cloud database 171 may be a POSTGRES database. The cloud database 171 may store geospatial files 174 used to generate the multilayer geographic visualizations 126, and may store elevation data 177 used to generate the elevation visualizations 132. A geospatial file 174 contains geographical information that is associated with a geographic location or position. The geospatial file 174 may have a geometric representation such as points, polygons, or lines. The elevation data 177 may include ground elevations 181 and clutter elevations 184 for various geographic locations. As mentioned above, a ground elevation 181 may refer to an elevation of the ground or surface of a particular location relative to sea level. The clutter elevation 184 may refer to an elevation of any type of clutter or object at the particular location relative to the ground elevation. The clutter elevation may be determined by adding the height of the clutter, or object above ground, to the ground elevation at that location. The ground elevation 181 and the clutter elevation 184 may be stored at the cloud database 171 in association with location information (e.g., latitude and longitude coordinates or ranges) of the location of the ground elevation 181 and the clutter elevation 184. The cloud database 171 may refer to a geospatial database storing geospatial files 174 and elevation data 177 in one or more databases or across one or more servers in the cloud system 113.

As mentioned above, the elevation data 177 may be received from disparate databases, both open source and not. The cloud database 171 may receive the elevation data 177 and convert the elevation data 177 into a format that is compatible with the cloud database 171, the iCSNE system 111, and the other elevation data 177. In an embodiment, the cloud database 171 may perform pre-processing, normalization, and/or conversion functions on the elevation data 177 to seamlessly align the elevation data retrieved from various different types of databases, before storing the elevation data at the cloud database 171.

While FIG. 1 shows the cloud system 113 as including the cloud database 171, in an embodiment, the cloud database 171 may be external to the cloud system 113, or even stored at a separate cloud system owned by a different cloud host. A single cloud host, or multiple different cloud hosts, may own and operate the elevation application 165 and cloud database 171 in the cloud system 113. In addition, the elevation application 165 and cloud database 171 may be stored and executed within the same data center, same server, different servers, or different data centers of the cloud system 113. The APIs 168 may be used to communicate with the UE 102, workstation 103, carrier network 108, and/or the iCSNE system 111. While FIG. 1 shows the cloud system 113 including only the elevation application 165, the API 168, and the cloud database 171, it should be appreciated that the cloud system 113 may include other components not shown in FIG. 1.

Figure 2:
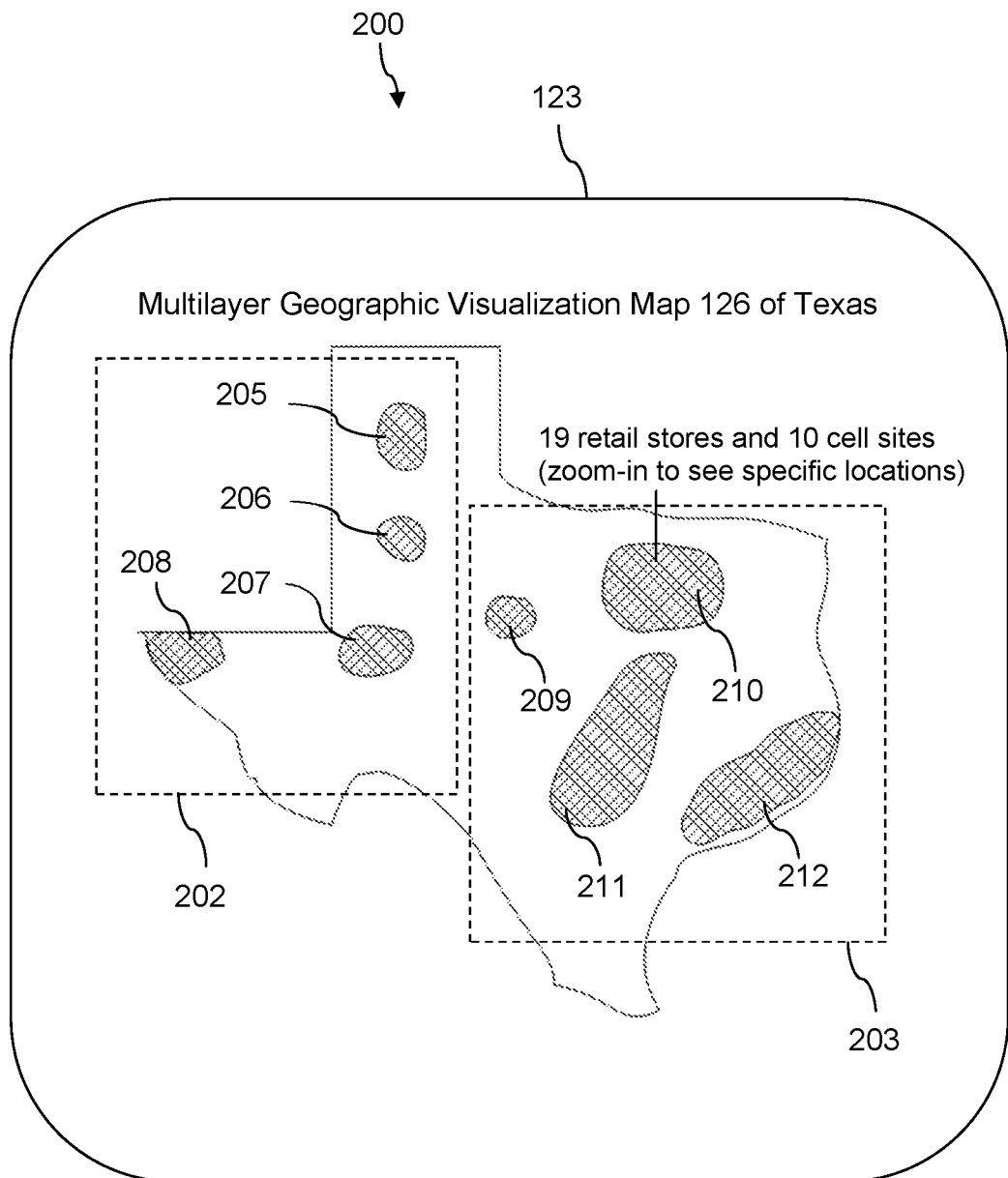
FIG. 2 is an illustration of an example user interface screen displayed at a workstation of the communication system of FIG. 1 according to an embodiment of the disclosure.

Turning to FIG. 2, a screen 200 of the UI 123 displayed on the workstation 103 is described. The UI 123 displays an example of a multilayer geographic visualization 126 of the state of Texas. In an embodiment, the client application 119 may generate the UI 123, and may communicate with the carrier network 108, the iCSNE system 111, and/or the cloud system 113 via a series of API calls using the APIs 135, 136, 144, 156, and 168 based on instructions and data received via the UI 123. The client application 119 may also display multilayer geographic visualization 126 on the UI 123.

The multilayer geographic visualization 126 displays geographic areas 205-212 in Texas with radio coverage from the carrier network 108. For example, communications signals being transmitted between a device registered with the carrier and one or more cell sites 114 in the geographic areas 205-212 may have a signal strength above a certain threshold, to be a geographic area 205-212 included in the multilayer geographic visualization 126.

A user may zoom in to one of these geographic areas 205-212 to see additional information regarding the geographic area 205-212. For example, the geographic area 210 may represent the Dallas/Ft. Worth metroplex, and a user may interact with the UI 123 to zoom into the geographic area 210 to view additional details regarding the geographic area 210. Once geographic area 210 has been zoomed in, the UI 123 may display a second screen including additional details on a zoomed in version of multilayer geographic visualization 126. The additional details may include, for example, the specific locations of the retail stores present in the geographic area 210, specific locations and/or types of the cell sites 114 present in the geographic area 210, types of radio coverage within various areas of the geographic area 210, etc. For example, the geographic area 210 may include different shadings throughout the multilayer geographic visualization 126 to illustrate the signal strength at various locations in the geographic area 210.

As shown in FIG. 2, the UI 123 displays two layers 202 and 203 of data on the multilayer geographic visualization 126. The first layer 202 includes the geographic areas 205-208, and the second layer 203 includes the geographic areas 209-212. The different layers 202 and 203 may be associated with different types of data, sources of data, and/or import files. For example, the data used to generate the first layer 202 may include network data 138, while the data used to generate the layer 203 may include the radio data 129. As another illustrative example, the data used to generate the first layer 202 may have originated from a first source, which may have been created by a carrier technologist who gathered the radio coverage data describing the geographic areas 205-208. Meanwhile, the data used to generate the second layer 203 may have originated from a second source, which may have also been created by a carrier technologist who gathered the radio coverage data describing the geographic areas 209-212. Each carrier technologist may operate a workstation 103 to upload data and generate a respective geospatial file 174, until the visualization application 153 creates a layer in a human visualization format.

Figure 3A:
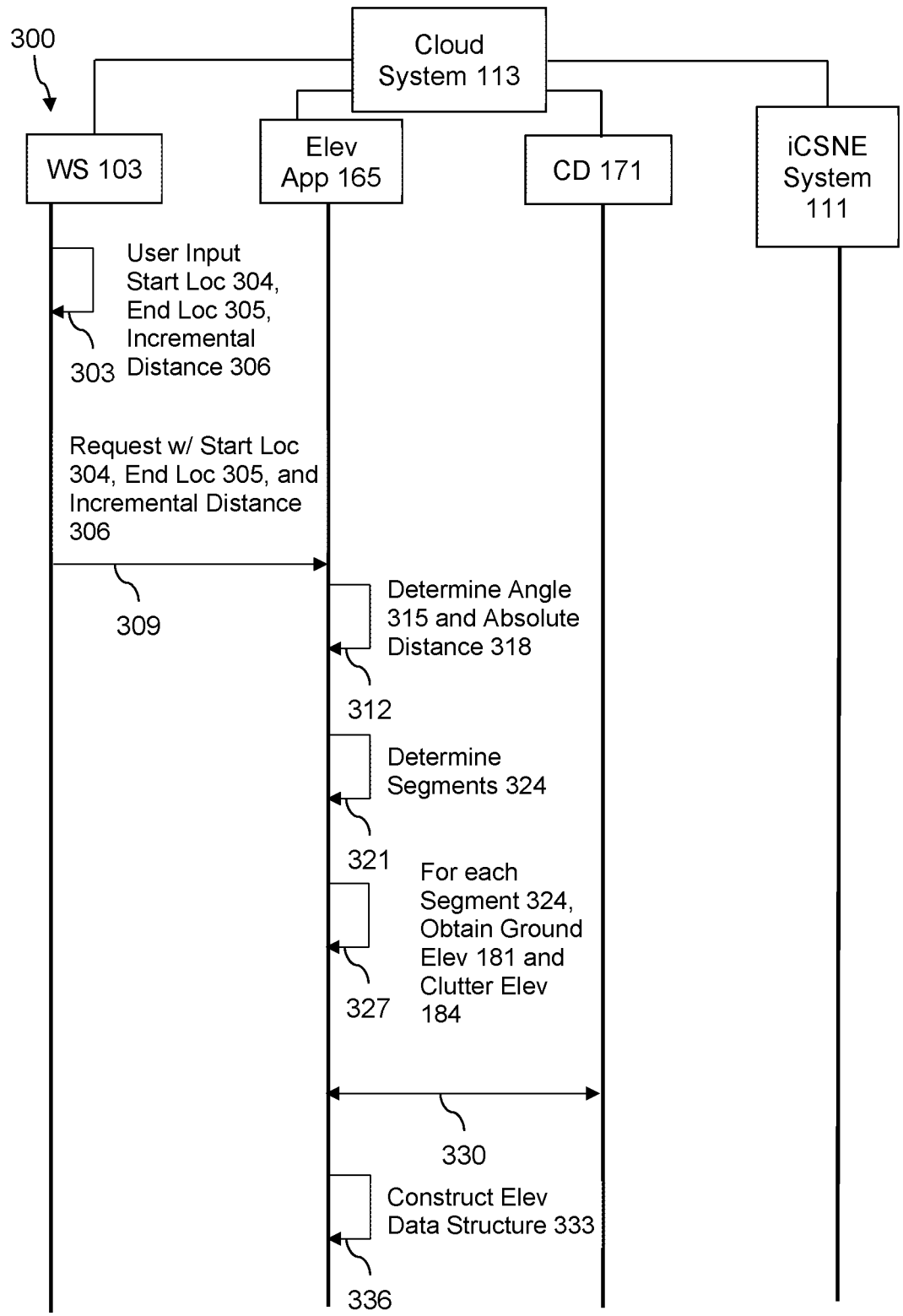
FIGS. 3A-B is a message sequence diagram illustrating an example method performed by components in the communication system of FIG. 1 according to an embodiment of the disclosure.
Figure 3B:
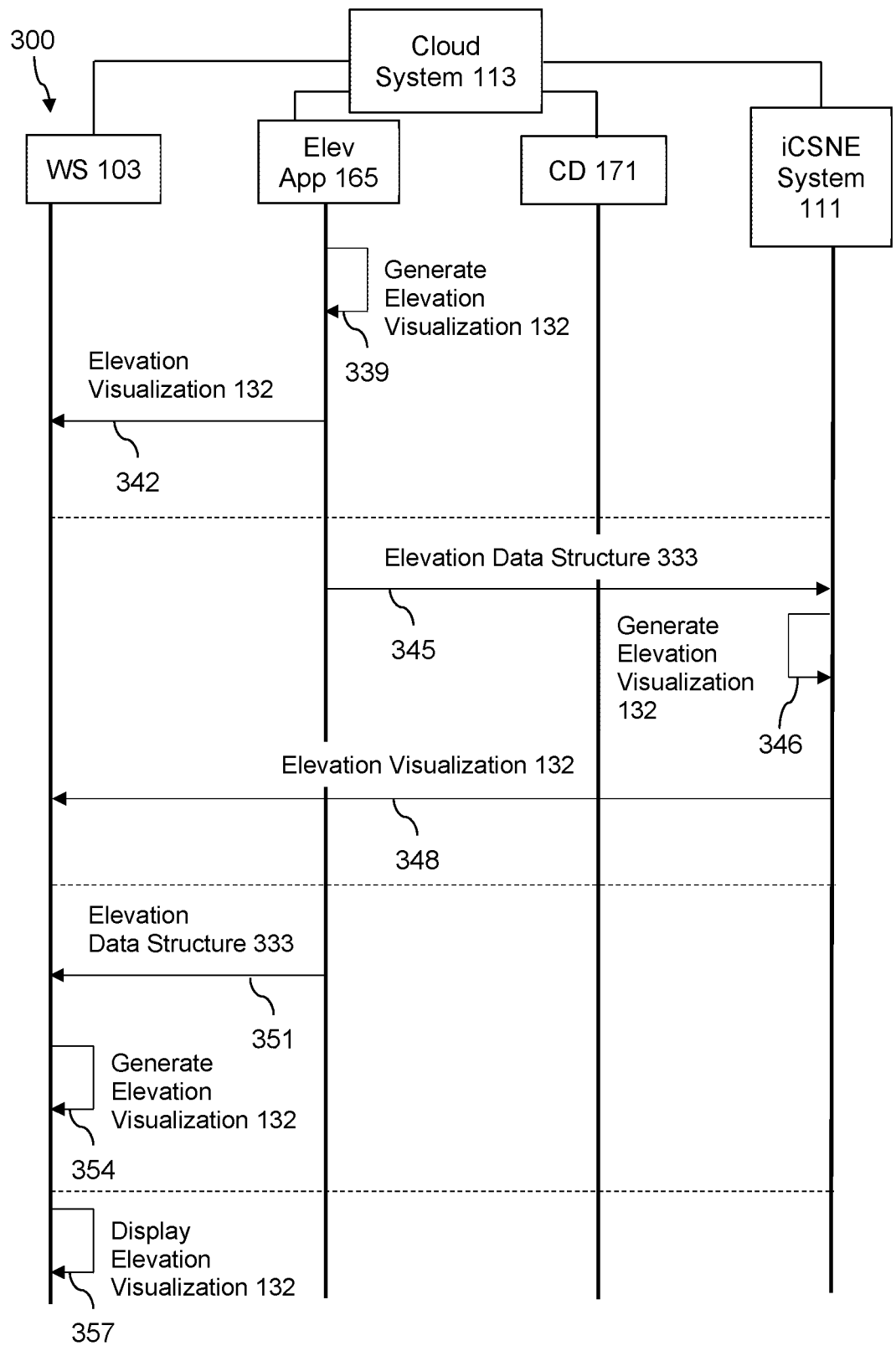

Turning now to FIGS. 3A-B, shown is a message sequence diagram illustrating a method 300, performed by the workstation 103, the cloud system 113, and the iCSNE system 111. More specifically, the elevation application 165 and the cloud database 171 in the cloud system 113 may perform the steps of the cloud system 113 in method 300. In an embodiment, method 300 may be performed after the client application 119 displays a map, such as the multilayer geographic visualization 126, on a display of the workstation 103.

Turning now specifically to FIG. 3A, method 300 begins with step 303. At step 303, the workstation 103 may receive a user input via the UI 123. The user input may be a first selection at a first location on the multilayer geographic visualization 126 and a second selection at a second location on the multilayer geographic visualization 126. The first location may correspond to a start location 304, and the second location may correspond to an end location 305, or vice-versa. The client application 119 may render a line representing the path between the start location 304 and the end location 305 on the multilayer geographic visualization 126.

In an embodiment, the user input may also include a manual entry of an incremental distance 306 via, for example, a text box. The incremental distance 306 may be a distance by which to segment the path between the start location 304 and end location 305 into multiple different segments representing different locations along the path. The incremental distance 306 may be based on an absolute distance between the start location 304 and the end location 305.

In an embodiment, the system may set a preset value to be the maximum permitted incremental distance. For example, the maximum permitted incremental distance may be 100 miles. The client application 119 may revert to a default incremental distance 306 preset by the system when an entered incremental distance exceeds the maximum permitted incremental distance.

In another embodiment, the system uses a default incremental distance 306, which may be based on the absolute distance between the start location 304 and the end location 305. For example, the default incremental distance 306 may be proportional to the absolute distance between the start location 304 and the end location 305. The workstation 103 may generate a request with the latitude and longitude coordinates of the start location 304, the latitude and longitude coordinates of the end location 305, incremental distance 306, and/or any other data that may be used to create the elevation visualization 132.

In an embodiment, the system may also have preset a maximum absolute distance between the start location 304 and the end location 305. For example, the maximum absolute distance may be 150 kilometers. The maximum absolute distance between the start location 304 and the end location 305 may be based on scalability. For example, higher powered database servers executing the elevation application 165 may have a higher maximum absolute distance between the start location 304 and the end location 305. The client application 119 may determine the absolute distance between the start location 304 and the end location 305. The client application 119 may notify the user to select new locations or discard the request when the absolute distance between the start location 304 and the end location 305 is greater than the maximum absolute distance.

At step 309, the workstation 103 may transmit the request including the start location 304, end location 305, incremental distance 306, and/or any other information to the elevation application 165 at the cloud system 113. For example, the request may be a hypertext transfer protocol (http) call to the cloud database 171 via a node connector, such as, a POSTGRES Node Connector.

At step 312, the elevation application 165 may receive the request and determine an angle 315 between the start location 304 and the end location 305. The elevation application 165 may also determine the absolute distance 318 between the start location 304 and the end location 305. For example, the elevation application 165 may determine the angle 315 and absolute distance 318 using open source geographical data related to the start location 304 and the end location 305.

At step 321, the elevation application 165 may determine the path between the start location 304 and the end location 305, the path representing a geographic area between the start location 304 and the end location 305. The elevation application 165 may divide this path into N segments 324 based on the incremental distance 306. For example, the absolute distance 318 between the start location 304 and the end location 305 may be 100 miles, and the incremental distance 306 may be 10 miles. The elevation application 165 may divide the path between the start location 304 and the end location 305 into 10 segments 324, with each segment 324 representing 10 miles. Each segment 324 may also be associated with location information representing the specific geographic area corresponding to the respective segment 324. For example, the location information may include multiple latitude and longitude coordinates indicating the outer boundaries of the specific geographic area corresponding to the respective segment 324.

In an embodiment, the cloud database 171 may include elevation data 177 for the specific geographic area corresponding to the respective segment 324, or at least a portion of the specific geographic area corresponding to the respective segment 324. At step 327, the elevation application 165 may determine the ground elevation 181 and clutter elevation 184 for each segment 324 along the path. For example, at step 330, the elevation application 165 may communicate with the cloud database 171 to retrieve or fetch the ground elevation 181 and clutter elevation 184 for each segment 324 based on the location information for each segment 324.

In an embodiment, the elevation application 165 may obtain the ground elevation 181 and clutter elevation 184 for each segment 324 along the path using an iterative loop, which ends upon the meeting of an exit condition. The iterative loop may perform the steps 327 or 330 for each segment 324. Each time the iterative loop executes, a current incremental distance value, which starts at 0 or the start location, may be incremented by the incremental distance 306. The iterative loop may continue to execute until the exit condition occurs. For example, the exit condition may occur when the current incremental distance value reaches a value of (the absolute distance 318—the incremental distance 306), or a value of (the end location 305—the incremental distance 306). Alternatively, the exit condition may occur when ((the current incremental distance value—path start point)<=(absolute distance 318 end point −10 meters).

At step 336, the elevation application 165 may construct an elevation data structure 333 including the ground elevation 181 and clutter elevation 184 for each segment 324. The elevation data structure 333 may be, for example, an array or a list, including a segment vector representing each segment 324. In one case, the segment vector may identify the segment 324 or a location corresponding to the segment 324. In another case, the elevation data structure 333 of segment vectors may be ordered sequentially from the start location 304 to the end location 305, such that the identification or location of the segment 324 or the location may not need to be included in the segment vector. In this way, the elevation data structure 333 inherently identifies the location of the segment 324 within the path based on the position of the segment vector within the elevation data structure 333.

In various embodiments, the elevation data structure 333 may be used to render the elevation visualization 132. The elevation visualization 132 may be generated by the elevation application 165 at the cloud system 113, by the visualization application 153 at the iCSNE system 111, by the workstation 103, or by any other application or hardware, either internal or external to the cloud system 113.

Referring now to FIG. 3B, method 300 continues with step 339. FIG. 3B illustrates three different embodiments by which elevation visualization 132 may be generated using the elevation data structure 333. In a first embodiment, at step 339, the elevation application 165 generates, or renders, the elevation visualization 132. For example, the cloud system 113 may maintain libraries for geospatial analysis, and the elevation application 165 may access the libraries maintained at the cloud system 113 to render the elevation visualization 132 as a human viewable visualization format. Subsequently, at step 342, the elevation application 165 may transmit the elevation visualization 132, in the human viewable visualization format, to the workstation 103.

In a second embodiment, the iCSNE system 111 may generate the elevation visualization 132. At step 345, the elevation application 165 may transmit the elevation data structure 333 to the iCSNE system 111. In this embodiment, the iCSNE system 111 maintains libraries for geospatial analysis, and the visualization application 153 may access the libraries maintained at the iCSNE system 111. At step 346, the visualization application 153 at the iCSNE system 111 may process the elevation data in the elevation data structure 333 to transform elevation data in the elevation data structure 333, using the libraries, into a human viewable visualization format as the elevation visualization 132. Subsequently, at step 348, the elevation application 165 may transmit the elevation visualization 132, in the human viewable visualization format, to the workstation 103.

In a third embodiment, at step 351, the elevation application 165 may transmit the elevation data structure 333 to the workstation 103 directly. In this embodiment, the workstation 103 may maintain or have access to libraries for geospatial analysis. The workstation 103 may also include an application, similar to the visualization application 153, that may generate various data visualizations in human viewable formats, using the libraries, for display at the workstation 103. At step 354, the workstation 103 may process the elevation data in the elevation data structure 333 to transform elevation data in the elevation data structure 333, using the libraries, into a human viewable visualization format as the elevation visualization 132.

Regardless of whether the elevation visualization 132 is rendered at the workstation 103, the cloud system 113, or the iCSNE system 111, the elevation visualization 132 is subsequently displayed at the workstation 103, at step 357. The client application 119 at the workstation 103 may display the elevation visualization 132 using, for example, the UI 123. For example, the elevation visualization 132 may be overlaid on top of the multilayer geographic visualization 126. As described above, elevation visualization 132 may display the ground elevation 181 and clutter elevation 184 for each segment 324 along the path between the start location 304 and end location 305. For example, the elevation visualization may be any type of visualization, such as, a histogram, chart, graph, scatter plot, etc.

Figure 4:
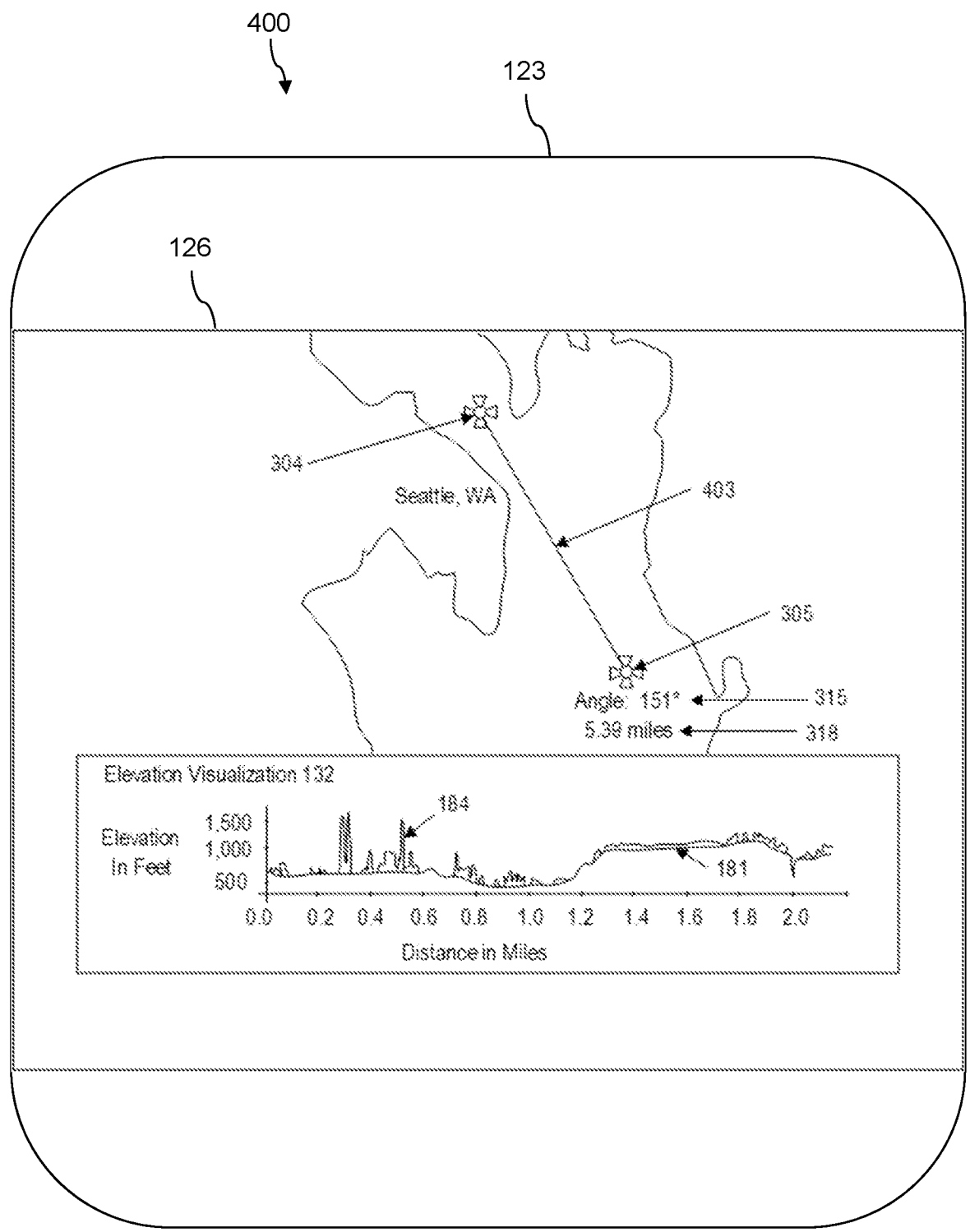
FIG. 4 is an illustration of another example user interface screen displayed at a workstation of the communication system of FIG. 1 according to an embodiment of the disclosure.

Turning now to FIG. 4, a screen 400 of the UI 123 displayed on the workstation 103 is described. The UI 123 displays an example of a multilayer geographic visualization 126 of a geographic region around Seattle, WA. In an embodiment, the client application 119 may generate the UI 123, and may communicate with the carrier network 108, the iCSNE system 111, and/or the cloud system 113 via a series of API calls using the APIs 135, 136, 144, 156, and 168 based on instructions and data received via the UI 123. The client application 119 may also display multilayer geographic visualization 126 on the UI 123.

In this example, the user viewing the multilayer geographic visualization 126 first selects a start location 304 and an end location 305 on the multilayer geographic visualization 126 displayed on the workstation 103. The user selects these two locations 304 to view an elevation visualization 132 indicating elevation differences of various objects on a path 403 between the start location 304 and the end location 305.

Upon selecting the start location 304 and the end location 305, the workstation 103 may send a request to the elevation application 165 to trigger the creation of the elevation visualization 132, as described above in FIGS. 3A-3B. After the workstation 103 receives or generates the elevation visualization 132, the client application 119 may display the elevation visualization 132 by overlaying the elevation visualization 132 on top of the multilayer geographic visualization 126. Alternatively, the client application 119 may display the elevation visualization 132 as a standalone window. The client application 119 may also display the angle 315 and the absolute distance 318 between the start location 304 and the end location 305.

The elevation visualization 132 shown in FIG. 4 is in the form of a histogram. However, it should be appreciated that the elevation visualization 132 may be shown in any other format by which the user may easily view the elevation differences in the geographic area on the path 403 between the start location 304 and end location 305.

As shown in FIG. 4, the elevation visualization 132 is a 2D histogram displaying the ground elevation 181 and the clutter elevation 184 along various locations between the start location 304 and end location 305. The X axis of the histogram indicates a distance in miles between the start location 304 and end location 305. The Y axis of the histogram indicates an elevation in feet for the ground elevation 181 and clutter elevation 184. In some embodiments, increments on the X axis (e.g., the 0.2 mile distance interval on the X axis) and increments on the Y axis (e.g., the 500 ft interval on the Y axis) may not necessarily correspond to the foregoing incremental distance 306 used to generate the elevation data structure 333. Instead, the elevation visualization 132 may determine the increments and labels across the X axis and Y axis based on various factors, such as, for example, the absolute distance 318, the angle 315, the actual ground elevation 181 and clutter elevation 184, the display capabilities of the workstation 103 (e.g., screen size, resolution, etc.), and/or various other factors.

In the example elevation visualization 132 shown in FIG. 4, only the first 2 miles of the elevation visualization 132 between the start location 304 and end location 305 is shown. However, the absolute distance 318 between the start location 304 and end location 305 is 5.38 miles. The user may interact with the UI 123 by, for example, sliding the elevation visualization 132 to the left, to view the remainder of the elevation visualization 132.

As shown by the elevation visualization 132, there is significant clutter elevation 184 at about 0.3 miles between the start location 304 and end location 305 and at about miles between the start location 304 and end location 305. Similarly, as shown by the elevation visualization 132, there is a higher ground elevation 181 after approximately 1.3 miles between the start location 304 and end location 305. The objects (e.g., clutter or ground) at these elevations may compromise, dampen, or otherwise block signals being transmitted between cell sites and targets at the start location 304 and/or end location 305.

The user or field engineer viewing this elevation visualization 132 may immediately make certain determinations regarding, for example, the positioning of new cell sites and/or existing cell sites. For example, suppose an existing cell tower at the start location 304 (i.e., distance 0.0 on the X axis) includes cellular technologies at 1,000 feet and angle 315, but has reported signal strength problems. The field engineer may determine, based on the elevation visualization 132, that there is significant obstruction between the start location 304 and end location 305 at the height of 1,000 feet. The field engineer may determine that, for example, the height of the cellular technologies at the tower should be increased to above 1,500 feet to reduce the possibility of signal interference due to obstructions on the path 403 between the start location 304 and the end location 305. Alternatively, the field engineer may determine another angle 315 by which to adjust the cellular technologies at the tower to avoid the obstructions shown in the elevation visualization 132.

As another illustrative example, suppose a new cell site at the start location 304 is being considered by the carrier company. The field engineer may use the elevation visualization 132 to determine heights and angles of the cellular technologies on a cell tower at the start location 304, to avoid possible obstructions that may affect signal quality and strength. Alternatively, the field engineer may determine, based on the elevation visualization 132, that it is best to refrain from placing a cell site at a particular location, or determine that a cell site at a particular location is needed. The field engineer may also select multiple different locations 304 and 305 to create multiple elevation visualizations 132, to select the best position for cell sites according to the different elevation visualizations 132. For example, the field engineer may use the same start location 304, but multiple different end locations 305 to create multiple different elevation visualizations 132. The field engineer may use these different elevation visualizations 132 to determine which of the different end locations 305 may be an optimal position for a cell site, a height of the cellular technologies at the cell tower, an angle of the cellular technologies at the cell tower, and/or any other specification of the cell site/technologies at the cell tower.

Figure 5:
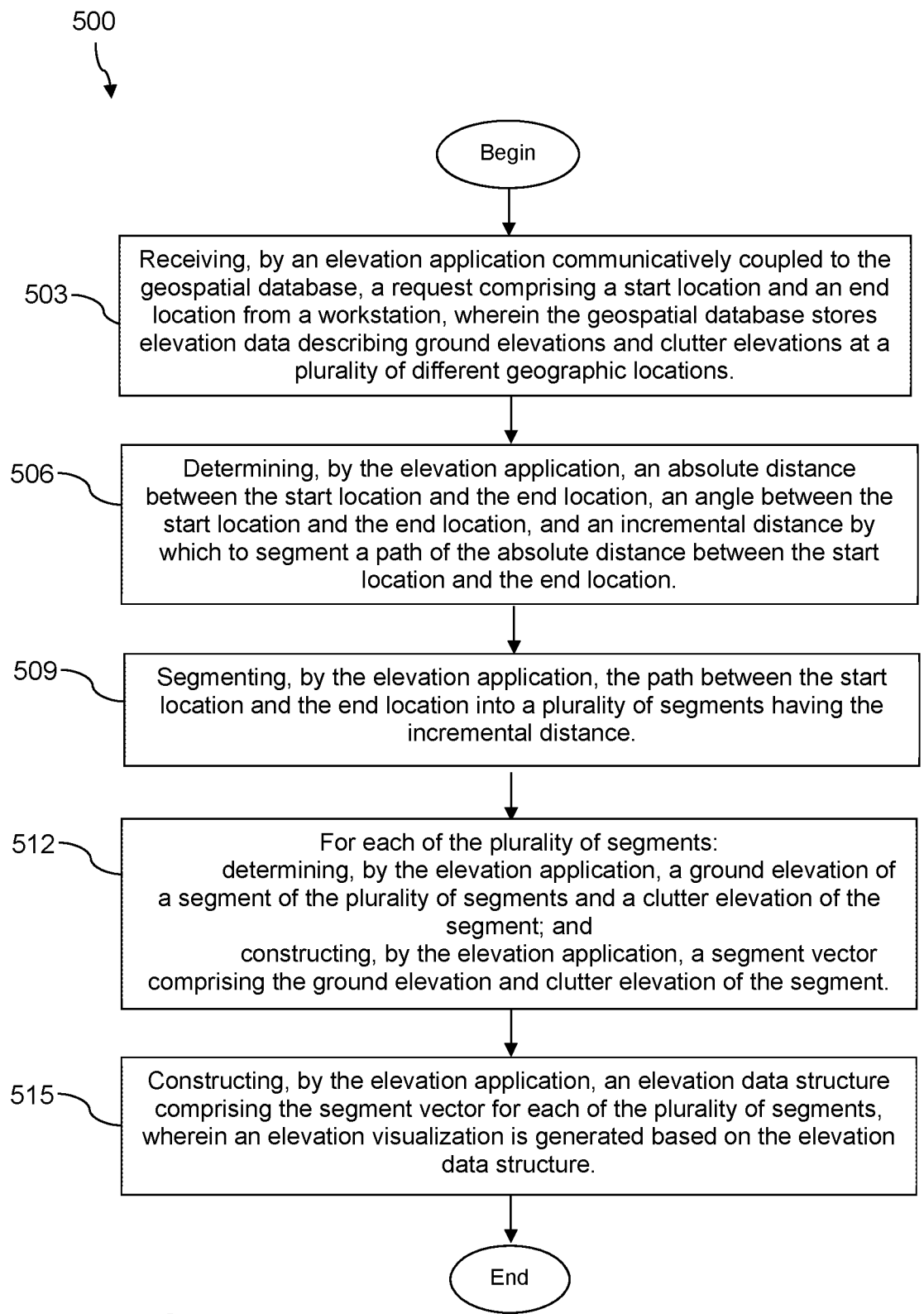
FIG. 5 is a flowchart of a first method according to an embodiment of the disclosure.

Turning now to FIG. 5, a first method 500 is described. Method 500 may be implemented by the elevation application 165. For example, method 500 may be performed by the elevation application 165 after the workstation 103 receives the start location 304 and end location 305 as user input and transmits a request including the start location 304 and end location 305 to the elevation application 165.

Method 500 may begin with block 503. At block 503, method 500 comprises receiving, by the elevation application 165 that is communicatively coupled to the geospatial database (i.e., the cloud database 171), a request. The request may comprise the start location 304, end location 305, and any other information pertaining to the elevation between the start location 304 and end location 305. The geospatial database may store elevation data 177 describing ground elevations 181 and clutter elevations 184 at multiple different geographic locations.

At block 506, method 500 comprises determining, by the elevation application 165, an absolute distance 318 between the start location 304 and end location 305, an angle 315 between the start location 304 and end location 305, and an incremental distance 306 over which to segment a path 403 of the absolute distance 318 between the start location 304 and end location 305. At block 509, method 500 comprises segmenting, by the elevation application 165, the path 403 between the start location 304 and the end location 305 into multiple segments 324, each being of the incremental distance 306.

Block 512 may be performed for each of the segments 324. At block 512, method 500 comprises determining, by the elevation application 165, a ground elevation 181 of a segment 324 and a clutter elevation 184 of the segment 324. At block 512, method 500 further comprises constructing, by the elevation application, a segment vector comprising the ground elevation and clutter elevation of the segment. At block 515, after the segment vectors for each of the segments 324 have been constructed, method 500 comprises constructing, by the elevation application 165, an elevation data structure 333 comprising the segment vector for each of the segments 324. In an embodiment, the elevation visualization 132 is generated based on the elevation data structure 333.

In an embodiment, method 500 further comprises determining, by the elevation application 165, a latitude coordinate range and a longitude coordinate range associated with each of the segments 324. In an embodiment, method 500 further comprises retrieving, by the elevation application 165, the ground elevation 181 of the segment 324 from the geospatial database based on latitude and longitude coordinates of the segment 324, and retrieving, by the elevation application 165, the clutter elevation 184 of the segment 324 from the geospatial database based on the latitude and longitude coordinates of the segment 324. In an embodiment, location information describing a location of each of the plurality of different geographic locations is stored in association with the ground elevations 181 and clutter elevations 184. In an embodiment, the path 403 between the start location 304 and the end location 305 is a geographic area between the start location 304 and the end location 305. In an embodiment, the path 403 is associated with a range of latitude and a range of longitude coordinates. In an embodiment, the elevation data structure 333 is a list or an array comprising the segments 324 in an order from the start location 304 to the end location 305. In an embodiment, the elevation visualization 132 is generated by at least one of the elevation application 165, the workstation 103, or a system external to both a cloud system 113 hosting the elevation application 165 and the workstation 103.

Figure 6:
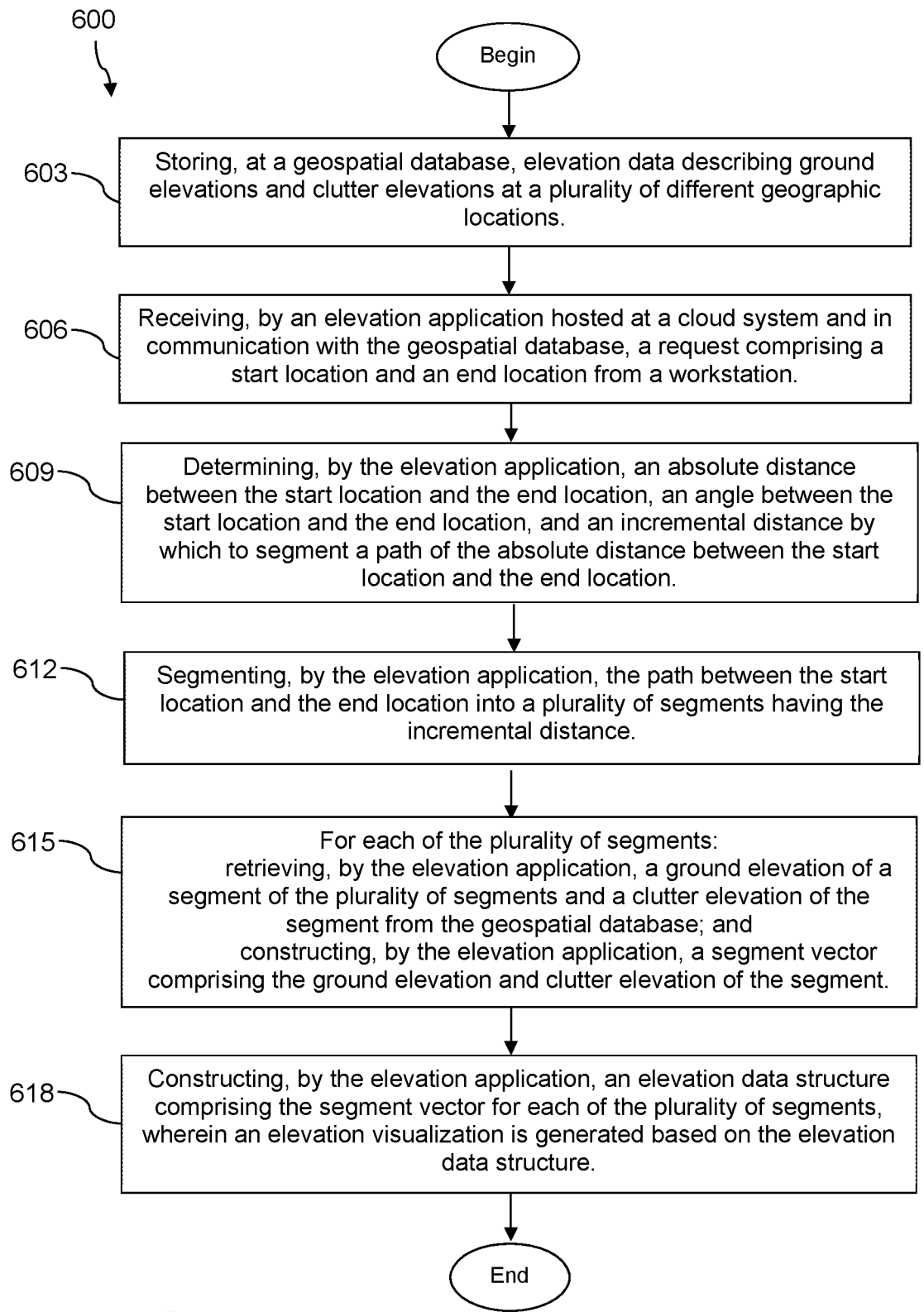
FIG. 6 is a flowchart of a second method according to an embodiment of the disclosure.

Turning now to FIG. 6, a second method 600 is described. Method 600 may be implemented by the system 100. For example, method 600 may be performed by the system 100 when the workstation 103 receives the start location 304 and end location 305 as user input.

Method 600 may begin with block 603. At block 603, method 600 comprises storing, at a geospatial database (i.e., the cloud database 171), elevation data 177 describing ground elevations 181 and clutter elevations 184 at different geographic locations. At block 606, method 600 comprises receiving, by the elevation application 165 hosted at the cloud system 113 and in communication with the geospatial database, a request. The request may comprise the start location 304, end location 305, and any other information pertaining to the elevation between the start location 304 and end location 305.

At block 609, method 600 comprises determining, by the elevation application 165, an absolute distance 318 between the start location 304 and end location 305, an angle 315 between the start location 304 and end location 305, and an incremental distance 306 over which to segment a path 403 of the absolute distance 318 between the start location 304 and end location 305. At block 612, method 600 comprises segmenting, by the elevation application 165, the path 403 between the start location 304 and the end location 305 into multiple segments 324, each being of the incremental distance 306.

Block 615 may be performed for each of the segments 324. At block 615, method 600 comprises retrieving, by the elevation application 165, a ground elevation 181 of a segment 324 and a clutter elevation 184 of the segment 324 from the geospatial database. At block 615, method 600 further comprises constructing, by the elevation application 165, a segment vector comprising the ground elevation 181 and clutter elevation 184 of the segment 324. At block 618, after the segment vectors for each of the segments 324 have been constructed, method 600 comprises constructing, by the elevation application 165, an elevation data structure 333 comprising the segment vector for each of the segments 324. In an embodiment, the elevation visualization 132 is generated based on the elevation data structure 333.

In an embodiment, prior to storing the elevation data 177 at the geospatial database, method 600 may comprise receiving, by the geospatial database, data regarding the ground elevations 181 and the clutter elevations 184 from different open source databases, and processing, by the geospatial database, the data regarding the ground elevations 181 and the clutter elevations 184 to normalize the data and convert the data into a format compatible with the geospatial database. In an embodiment, method 600 may comprise determining, by the elevation application 165, a latitude coordinate range and a longitude coordinate range associated with each of the segments 324. In an embodiment, method 600 may further comprise receiving, by the workstation 103, a first user input on a multilayer geographic visualization 126 displayed on the workstation 103, wherein the first user input indicates the start location 304, receiving, by the workstation 103, a second user input on the multilayer geographic visualization 126 displayed on the workstation 103, wherein the second user input indicates the end location 305, and sending, by the workstation 103 to the elevation application 165, the request comprising location information describing the start location 304 and the end location 305. In an embodiment, method 600 further comprises storing, at the geospatial database, location information describing a location of each of the different geographic locations in association with the ground elevations 181 and clutter elevations 184. In an embodiment, the path 403 between the start location and the end location is a geographic area between the start location and the end location, and wherein the path is associated with a range of latitude and a range of longitude coordinates.

Figure 7A:
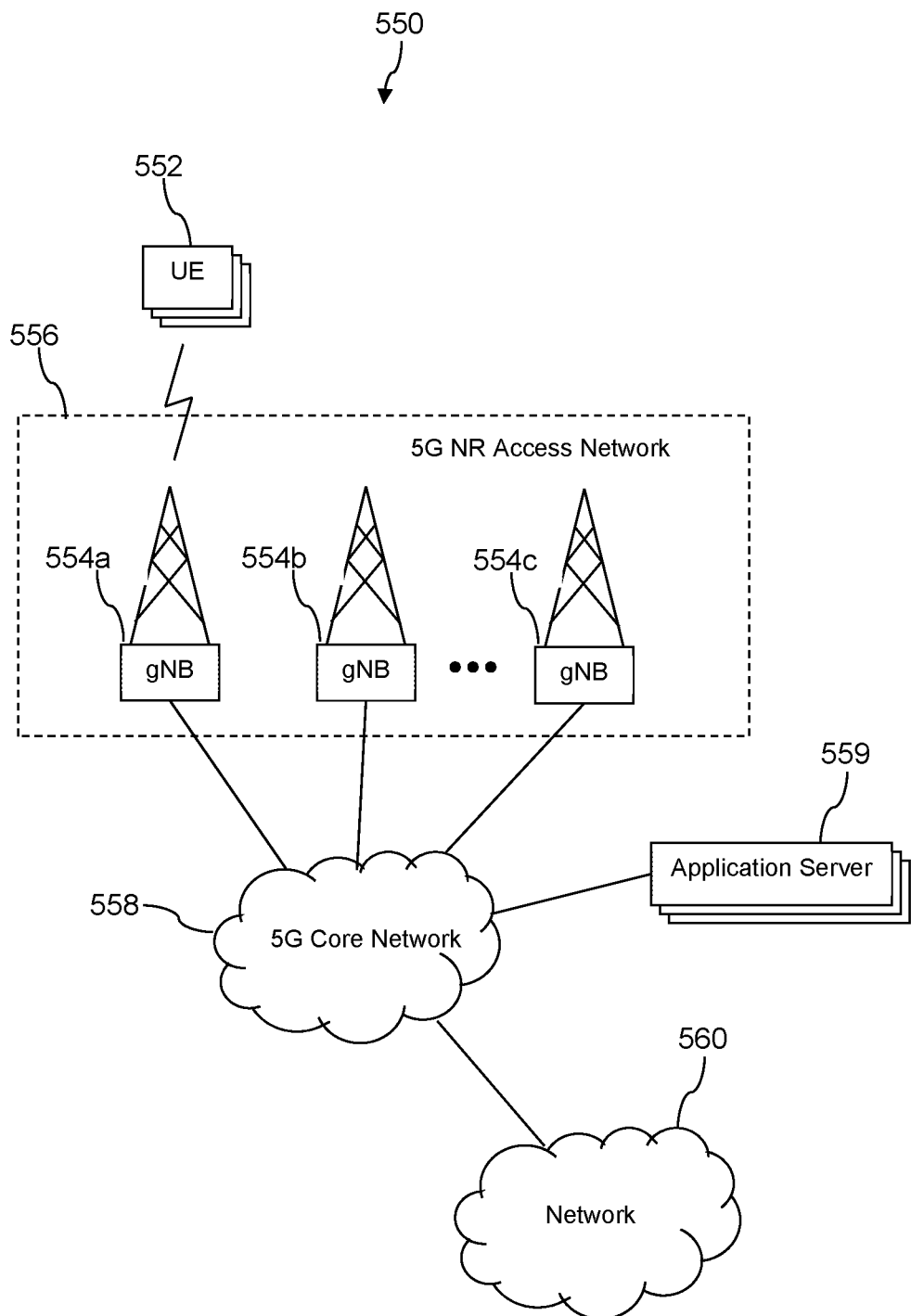
FIGS. 7A-B are block diagrams illustrating a communication system similar to the communication system of FIG. 1 according to an embodiment of the disclosure.

Turning now to FIG. 7A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the UE 102 and workstation 103, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (M IMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
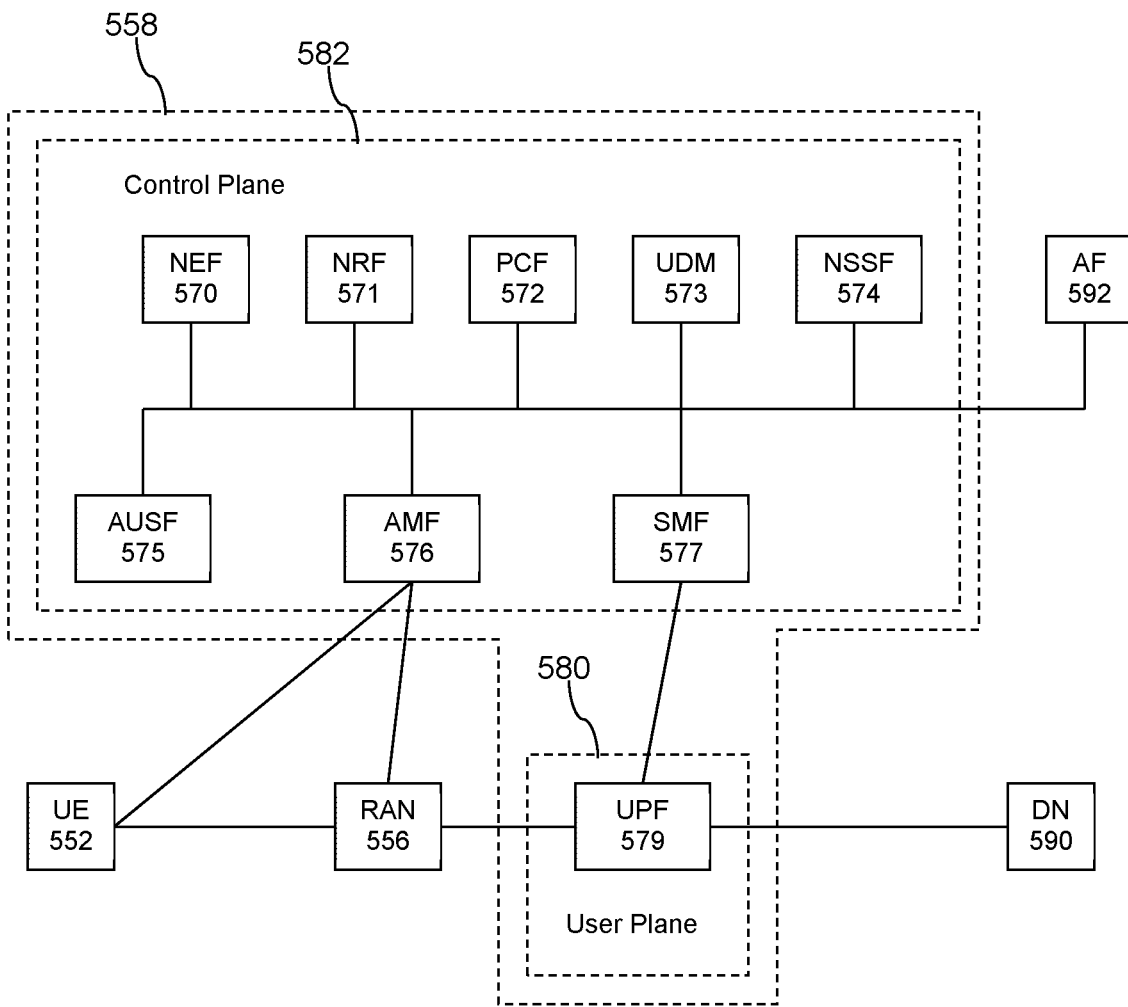

Turning now to FIG. 7B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 7A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 8:
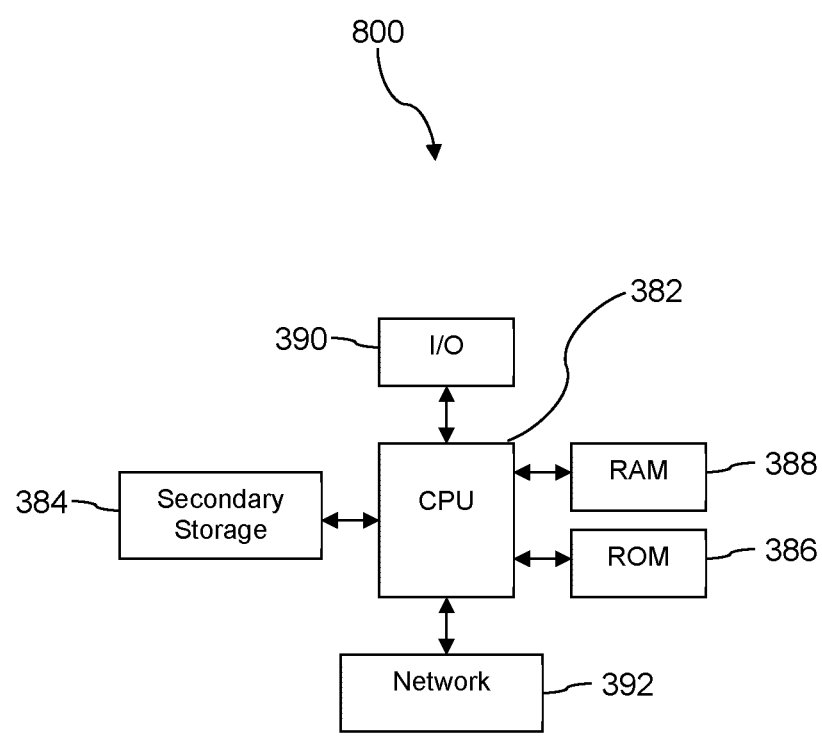
FIG. 8 is a block diagram of a computer system implemented within the communication system of FIG. 1 according to an embodiment of the disclosure.

FIG. 8 illustrates a computer system 800 suitable for implementing one or more embodiments disclosed herein. In an embodiment, the UE 102 and the workstation 103 may be implemented as the computer system 800. The computer system 800 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 800, at least one of the CPU 382, the RAM 388, and the ROM 386 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 800 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 384, to the ROM 386, to the RAM 388, and/or to other non-volatile memory and volatile memory of the computer system 800. The processor 382 may process the executable instructions and/or data structures in part by directly accessing the computer program product, for example by reading from a CD-ROM disk inserted into a disk drive peripheral of the computer system 800. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 800.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 800 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a system to generate an elevation visualization, wherein the method comprises:
receiving, by an elevation application communicatively coupled to a geospatial database, a request comprising a start location and an end location from a workstation, wherein the geospatial database stores elevation data describing ground elevations and clutter elevations at a plurality of different geographic locations;
determining, by the elevation application, an absolute distance between the start location and the end location, an angle between the start location and the end location, and an incremental distance by which to segment a path of the absolute distance between the start location and the end location;
segmenting, by the elevation application, the path between the start location and the end location into a plurality of segments having the incremental distance;
for each of the plurality of segments:
determining, by the elevation application, a ground elevation of a segment of the plurality of segments and a clutter elevation of the segment; and
constructing, by the elevation application, a segment vector comprising the ground elevation and clutter elevation of the segment; and
constructing, by the elevation application, an elevation data structure comprising the segment vector for each of the plurality of segments, wherein an elevation visualization is generated based on the elevation data structure.

2. The method of claim 1, further comprising determining, by the elevation application, a latitude coordinate range and a longitude coordinate range associated with each of the plurality of segments.

3. The method of claim 1, wherein determining, by the elevation application, the ground elevation of the segment of the plurality of segments and the clutter elevation of the segment comprises:
retrieving, by the elevation application, the ground elevation of the segment from the geospatial database based on latitude and longitude coordinates of the segment; and
retrieving, by the elevation application, the clutter elevation of the segment from the geospatial database based on the latitude and longitude coordinates of the segment.

4. The method of claim 1, wherein location information describing a location of each of the plurality of different geographic locations is stored in association with the ground elevations and clutter elevations.

5. The method of claim 1, wherein the path between the start location and the end location is a geographic area between the start location and the end location, and wherein the path is associated with a range of latitude and a range of longitude coordinates.

6. The method of claim 1, wherein the elevation visualization is generated by at least one of the elevation application, the workstation, or a system external to both a cloud system hosting the elevation application and the workstation.

7. The method of claim 1, wherein the elevation data structure is an array comprising the plurality of segments in an order from the start location to the end location.

8. A method performed by a communication system to generate an elevation visualization, wherein the method comprises:
storing, at a geospatial database, elevation data describing ground elevations and clutter elevations at a plurality of different geographic locations;
receiving, by an elevation application hosted at a cloud system and in communication with the geospatial database, a request comprising a start location and an end location from a workstation;
determining, by the elevation application, an absolute distance between the start location and the end location, an angle between the start location and the end location, and an incremental distance by which to segment a path of the absolute distance between the start location and the end location;

segmenting, by the elevation application, the path between the start location and the end location into a plurality of segments having the incremental distance;

for each of the plurality of segments:
retrieving, by the elevation application, a ground elevation of a segment of the plurality of segments and a clutter elevation of the segment from the geospatial database; and
constructing, by the elevation application, a segment vector comprising the ground elevation and clutter elevation of the segment;

constructing, by the elevation application, an elevation data structure comprising the segment vector for each of the plurality of segments, wherein an elevation visualization is generated based on the elevation data structure; and
displaying, by a workstation, the elevation visualization on top of a multilayer geographic visualization displayed on the workstation, wherein the multilayer geographic visualization depicts radio coverage data within a geographic area.

9. The method of claim 8, wherein prior to storing, at the geospatial database, elevation data describing ground elevations and clutter elevations:
receiving, by the geospatial database, data regarding the ground elevations and the clutter elevations from a plurality of different open source databases; and
processing, by the geospatial database, the data regarding the ground elevations and the clutter elevations to normalize the data and convert the data into a format compatible with the geospatial database.

10. The method of claim 8, further comprising determining, by the elevation application, a latitude coordinate range and a longitude coordinate range associated with each of the plurality of segments.

11. The method of claim 8, further comprising:
receiving, by the workstation, a first user input on the multilayer geographic visualization displayed on the workstation, wherein the first user input indicates the start location;
receiving, by the workstation, a second user input on the multilayer geographic visualization displayed on the workstation, wherein the second user input indicates the end location; and
sending, by the workstation to the elevation application, the request comprising location information describing the start location and the end location.

12. The method of claim 8, further comprising storing, at the geospatial database, location information describing a location of each of the plurality of different geographic locations in association with the ground elevations and clutter elevations.

13. The method of claim 8, wherein the path between the start location and the end location is a geographic area between the start location and the end location, and wherein the path is associated with a range of latitude and a range of longitude coordinates.

14. The method of claim 8, wherein the elevation visualization is generated by at least one of the elevation application, the workstation, or a system external to both a cloud system hosting the elevation application and the workstation.

15. A system comprising:
a workstation comprising:
at least one processor;
at least one non-transitory memory; and
a client application stored in the at least one non-transitory memory, which when executed by the at least one processor, causes the at least one processor to be configured to:
receive a user input on a multilayer geographic visualization displayed on the workstation, wherein the user input indicates a start location and an end location; and
send a request comprising location information describing the start location and the end location; and a cloud system comprising:
a geospatial database configured to store elevation data describing ground elevations and clutter elevations at a plurality of different geographic locations;
at least one processor;
at least one non-transitory memory; and
an elevation application stored in the at least one non-transitory memory, which when executed by the at least one processor, causes the at least one processor to be configured to:
receive the request comprising the start location and the end location;
segment a path between the start location and the end location into a plurality of segments having an incremental distance, wherein the incremental distance is based on an absolute distance between the start location and the end location;
obtain a ground elevation of each of the plurality of segments and a clutter elevation of each of the plurality of segments; and
construct an elevation data structure comprising a segment vector for each of the plurality of segments, wherein the segment for each of the plurality of segments comprises a ground elevation and clutter elevation for each of the plurality of segments, wherein an elevation visualization is generated based on the elevation data structure.

16. The system of claim 15, wherein the geospatial database is further configured to store the elevation data describing the ground elevations and the clutter elevations at the plurality of different geographic locations, in association with location information of each of the geographic locations.

17. The system of claim 15, wherein the elevation application further causes the at least one processor to be configured to:
retrieve the ground elevation of the segment from the geospatial database based on latitude and longitude coordinates of the segment; and
retrieving, by the elevation application, the clutter elevation of the segment from the geospatial database based on the latitude and longitude coordinates of the segment.

18. The system of claim 15, wherein the elevation application further causes the at least one processor to be configured to determine a latitude coordinate range and a longitude coordinate range associated with each of the plurality of segments.

19. The system of claim 15, wherein the path between the start location and the end location is a geographic area between the start location and the end location, and wherein the path is associated with a range of latitude and a range of longitude coordinates.

20. The system of claim 15, wherein the client application causes the at least one processor to be configured to display the elevation visualization on top of the multilayer geographic visualization displayed on the workstation, wherein the multilayer geographic visualization depicts radio coverage data within a geographic area comprising the start location and the end location.

\* \* \* \* \*